Jan. 27, 1970 S. T. HARMON 3,492,641

ERROR CORRECTING DIGITAL COMMUNICATION SYSTEM

Filed Jan. 11, 1967 4 Sheets-Sheet 1

INVENTOR
SAMUEL T. HARMON

BY Hauke, Krass, & Gifford
ATTORNEYS

INVENTOR
SAMUEL T. HARMON
BY Hauke, Krass, & Gifford
ATTORNEYS

Jan. 27, 1970 S. T. HARMON 3,492,641

ERROR CORRECTING DIGITAL COMMUNICATION SYSTEM

Filed Jan. 11, 1967 4 Sheets-Sheet 3

INVENTOR
SAMUEL T. HARMON

BY Hauke, Krass, & Gifford
ATTORNEYS

United States Patent Office 3,492,641

Patented Jan. 27, 1970

3,492,641

ERROR CORRECTING DIGITAL COMMUNICATION SYSTEM

Samuel T. Harmon, Ann Arbor, Mich., assignor to Datamax Corporation, Ann Arbor, Mich., a corporation of Michigan

Filed Jan. 11, 1967, Ser. No. 608,609
Int. Cl. G08b *29/00;* G06f *11/00*
U.S. Cl. 340—146.1 15 Claims

ABSTRACT OF THE DISCLOSURE

A digital communication system which receives a message consisting of a series of binary digits, encodes it into a form containing the original information digits as well as a plurality of digits representing the sums of parity equations. These are transmitted to a receiver which decodes the message into its original form by first recalculating the parity equations from the received information digits and then comparing the results with each of the received parity digits to determine if agreement exists between the two. The decoder then constructs an optical matrix wherein each of the rows represents one parity check equation and is illuminated if that parity check equation was not satisfied by the comparison of the calculated parity check digit and the received digit. This matrix is projected through a mask constructed from the original parity check equations to produce a second matrix wherein any location is illuminated when it is in a row illuminated in the first matrix and it coincides with a hole in the mask at that location. The number of illuminated spots in each column of the second matrix are counted by electronic techniques and each column sum is operated on logically to determine whether the digit of the message represented by that column was correct. This information is used to correct the incoming message and the result represents the output of the system. Alternative embodiments employ two dimensional diode matrices and capacitive storage matrices as a substitute for the second matrix.

BACKGROUND OF THE INVENTION

Field of the invention

This invention pertains to digital data transmission systems wherein a message is encoded at the transmitter into a form containing information bits plus a plurality of parity bits, which represent the sum of separate parity equations, and this message is transmitted to the receiver wherein the parity sums are recalculated and errors are detected and corrected to produce a final output message.

Description of the prior art

The problem of correctly transmitting digital signals over a noisy channel is a significant one, the solution to which has been actively sought. Some illustrative situations in which this problem arises are: when telephone lines and radio links subject to noise are used to transmit data; when an imperfect medium such as magnetic tape or a photographic emulsion is used to store data; or when operations on binary signals are carried out by electronic circuits such as relays, diodes, or transistors, which have a probability of error. All of these situations share a common problem, which will be considered in the following description in terms of information transmission over a communications channel.

It has previously been recognized that in order to maximize the rate of transmission of binary information over an electromagnetic communication channel wherein noise is introduced, without exceeding a particular probability of error in the message at the received and, it is necessary to encode the transmitted message in some redundant form which may be decoded at the received end in order to detect and/or correct any errors introduced by the transmission process. Iterative encoding, that is, simply repeating a particular message a number of times and then utilizing those digits which are received a majority of times at the receiver, is a very simple way of encoding but is extremely inefficient in utilization of channel capacity. Accordingly, most efforts to develop codes, and encoding and decoding systems for achieving low probability of error and/or high untilization of transmission channel capacity have been directed to systems wherein one or more parity bits which represent the modulo 2 sum of the bits occupying other predetermined positions in the message have been added to the information bits to produce a coded message. For example, see Hamming Patent No. 2,552,629. In such systems the encoder computes a number of parity digits based upon the sum of the digits which occur at preassigned points in the message (either the true information or the encoded message) and then adds these into the message either by interleaving them or adding them to the end of the information bits. The receiver recomputes the parity bits from the received message and compares them with the received parity bits to detect errors. Various codes have been proposed which make it conceptually possible to correct the thus detected error.

Apparatus for achieving the encoding has generally been relatively simple and inexpensive. The decoding systems proposed have been relatively simple where short messages are transmitted, but their complexity has generally been a geometric function of the message length so that relatively long messages require prohibitively complex decoding equipment. This geometric increase in the complexity of the decoder as the block length increases results from the fact that the parity equations must be solved to detect errors in the manner of a plurality of simultaneous equations relating to an unknown; each equation being only meaningful in the light of the condition of all the other equations. Accordingly, the storage capacity of the decoder and the number of manipulative steps required increases rather generally with the square of the length of the message. While the possibility of dividing a relatively long message into a series of short segments so that a simple decoder could be used suggests itself, it has been mathematically demonstrated that given a maximum allowable probability of error in the received message, the efficiency of utilization of a communication channel (the maximum rate of transmission of information bits) increases with the message length, or basic block length employed. This follows from the proposition that given an equal probability that any bit in a message is received incorrectly, the probability that any given percentage of bits in a message in excess of that equal probability are received incorrectly decreases with the message length. If the probability that a particular bit is received correctly is ⅕, there is a much higher probability that 50% of the digits in a five bit message are wrong than that 50% of the digits in a fifty word message are wrong. Accordingly, with a relatively long message a lower ratio of unencoded to encoded length will be required to correct the same percentage of errors as a shorter message with a higher ratio. See, "Transmission of Information," Robert M. Fano, MIT-Wiley, N.Y., 1961. The search for efficient codes, and encoding and decoding equipment, has encountered an obstacle in the complexity of receiving equipment required when using normal decoding techniques.

SUMMARY OF THE INVENTION

The present invention contemplates relatively inexpensive apparatus for decoding block parity codes which is capable of operating upon messages of quite long block length, and can therefor utilize communication channels with a high degree of efficiency. In its broadest form the present invention provides decoders which regenerate parity check digits from the received information and compare these with the received parity digits to sense errors in the received message. The parity check equations of the incorrect parity check digits are then operated on in a matrix to determine the most likely points in the information digits in which the errors occurred so that they can be corrected. In one class of such decoding equipment, the decoder employs a two dimensional radiation sensitive surface as a storage medium (for a matrix) which is constructed by modulating a two dimensional radiation field with information related to the differences between solutions of parity check equations calculated from received data and the parity digits encoded in the received data. This two dimensional radiation field is passed through a mask constructed on the basis of the parity check equations, and the resultant field, which represents the product of the mask matrix and the radiation field matrix, is temporarily stored on the radiation sensitive surface. Elements of the matrix are then counted to produce information relating to the relation between each digit in the received message and the errors noted by the comparison of the parity check equations calculated from the received data and the received parity check digits. This information is used to modify the received message to provide a corrected message as an output.

A preferred embodiment of the invention, which will subsequently be described in detail, utilizes a systematic parity code; that is, a code wherein the parity digits follow the information digits. The decoder of the preferred embodiment employs a clock which generates timing signals in synchronism with the reception of incoming bits in an encoded message. The encoder contains one bi-stable device for each of the parity check equations to be calculated from the incoming message. As the bits of the message are received in serial form a 1 in a particular digit position enables one input of each of a number of "AND" gates which are associated with each of the bi-stable devices. The other input to each of the AND gates receives a sequence of timing signals related to the position of the bit being received in the message. The particular pattern of timing pulses applied to each AND gate is dependent upon the exact parity check equation to be calculated by that AND gate. When a 1 in the incoming message coincides with a particular timing pulse received by the AND gate the condition of the associated bi-stable device is reversed. At the end of the receipt of the information bits in the message the conditions of each of the bi-stable devices represents the calculated sum of each of its associated parity check equation. The parity check bits of the message as they are received are then compared with the condition of that one of the bi-stable devices which represents that bit's particular parity check equation. The results of this comparison are used to construct a matrix wherein each of the rows represents the digits in one parity check equation and the elements in each column all represent the same digit in the message. An output indication is provided at any point in the matrix if the parity check equation represented by the particular row that a point is located in did not agree with the received parity digit, and if a 1 occurs in the parity check equation at that bit position.

This is done by first horizontally scanning successive vertically spaced lines on a cathode ray tube face in timed relation to the comparison of the sum of the calculated parity check equations with the received parity digits. An inequality between the two is used to modulate the Z axis of the oscilloscope so that the horizontal line representing that particular parity check equation is illuminated. The display on the cathode ray tube face is then a number of horizontal lines arranged in the rows of those calculated parity check equations which did not agree with the received parity digits. A rectangular mask is disposed over the face of the cathode ray tube and has holes formed in it at each point in the matrix at which a 1 occurs in a parity check equation. Viewing the cathode ray tube through the mask one would then see a matrix wherein any point illuminated is representative of a 1 appearing in a particular parity check equation associated with an illuminated row. A photosensitive storage surface consisting of the face of a storage tube such as a vidicon is supported adjacent to the mask so that the illuminated matrix stores charges at points on the vidicon face which are the equivalent of illuminated points seen through the mask. The illuminated points in any column of the vidicon face are then counted by vertically scanning that column with the vidicon beam and providing the resultant pulses from the tubes signal grid to a counter circuit. The sum of pulses providing the scan of each column represents the number of incorrect parity check equations that a particular bit in the message is represented in. This number if compared with a predetermined count that is based on the number and characteristics of the parity check equations, and if the sum of a column exceeds the predetermined number an output signal is provided which is used to correct the digit in a particular bit position of the received message by reversing its nature; if the bit was previously a 0 it is converted to a 1 and vice versa. This is done by admitting the received message, bit by bit, from a fixed delay device in synchronizatien with the scanning of a particular vertical column representing that bit and comparing each emerging bit with the signal from the comparison device associated with the counter. The corrected message represents the output of the system.

By utilizing a two dimensional radiation sensitive surface as a storage device a decoder arrangement is provided wherein the complexity of the decoder is an arithmatic rather than a geometric function of the length of a code word. A decoder formed in accordance with the preferred embodiment can handle incoming messages having say 500 bits as easily as messages having 250 bits. The only increase in equipment represents one bi-stable device for each bit to calculate the parity check equation. Thus, the decoder for 500 bits would cost less per bit than the decoder for 250 bits, since it would utilize the same matrix construction arrangement.

Decoders formed in accordance with the present invention are capable of utilizing any parity type block code, be it designed for special correction of "gaussian" noise, "burst" type noise or combinations of the two. The decoder could also be used in combination with other decoding equipment.

Other objects, advantages and applications of the present invention will be made apparent by the following detailed description of a preferred embodiment of the invention. The description makes reference to the accompanying drawings in which.

The preferred embodiment of the invention operates in the binary system as do all operational information transmission systems of this broad class. However, the broad principals of the present invention are equally applicable to higher order number systems.

Figure 1:
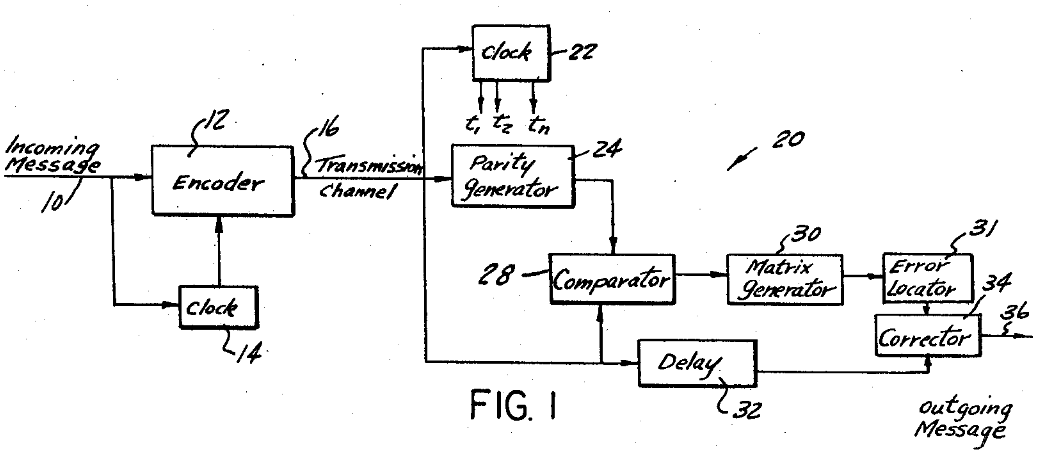
FIGURE 1 is a block diagram of a preferred embodiment of the invention operative to receive a binary message, encode it into a redundant form, and transmit the encoded message to a decoder which detects and corrects any errors introduced during the transmission process to provide the corrected output message.

Referring to FIGURE 1, a binary message to be transmitted by the system is provided on line 10. The encoding apparatus 12, operating in a synchronous manner under control of a clock 14, converts the message to a more redundant form by generating various parity check digits in accordance with a predetermined code and adding them to the incoming information bits as received on line 10 to arrive at the encoded form of the message. This is then transmitted over an electromagnetic communication channel 16 which may constitute a wire or radio channel, for example. The channel might be within a single unit or system, such as a computer. The main characteristic of the channel is that it is imperfect so that the message at its output is not identical to the message at its input, but rather is distorted by the addition of noise signals. The signal at the output of the transmission line is fed to a decoder, generally indicated at 20. The decoder is operated in synchronism with the incoming message by means of a clock 22 which receives the output of the communication channel and generates a plurality of timing pulses which are provided to all the other units of the decoder. The incoming signal is also fed to a parity generator 24 which is operative to perform the same calculations on the received messages as the encoder 12 did on the incoming message to generate a series of parity digits which are the equivalent of the digits which were added to the incoming message by the encoder 12. As the calculated parity digits emerge from the generator 24 they are compared with the actual received digits by a comparator 28. The output of the comparator 28 is employed by a matrix generator 30 to construct a two dimensional matrix based upon information in the parity check equations and inconsistencies between the received and calculated parity bits as detected by the comparator 28. The output of the matrix generator 30 is information relating to the accuracy of individual digits in the received message. This information is provided to an error locator unit 31, and this unit's output, as well as the incoming message from a delay unit 32, is fed to a corrector 34 which provides a corrected message on the output line 36.

CHOICE OF CODE

The present invention may be used with any form of code wherein the incoming message consists of a series of digits and the transmitted or encoded message consists of the same information digits plus a plurality of parity digits which are either interleaved with the information digits or arranged consecutively after them in the encoded message. Each parity digit represents the modulo 2 sum of digits which occur in predetermined digit positions of either the incoming message alone or the incoming message plus certain other calculated parity digits. For the purposes of the present description of the preferred embodiment of the invention the code used would be a "systematic" one wherein the encoded message consists first of the information bits, followed by the parity bits, the parity bits all being calculated on the basis of the digits of the information bits alone.

Each parity bit represents the modula 2 sum of a separate parity check equation. By way of example, consider a message having four information bits which is to be encoded by the addition of four parity bits. While such a coding arrangement is quite inefficient and does not make use of the ability of the inventive apparatus to handle very long code words, it lends itself to a simple explanation of the operation of the system and is therefore chosen for illustrative purposes. The first parity bit succeeding the information bits might represent the modulo 2 sum of the digits in the first two information bits of the message. Thus, if the number of 1's in the first two bit positions was even, a 0 would be encoded in the first parity bit position (the fifth bit position of the message) and if the sum of the digits in the first two bit positions was odd, a 1 would be encoded in this first parity bit position. This could be symbolized as follows:

First parity bit=1100 where 1's represent the bits of the message which are to be considered in calculating a particular parity bit. The parity equations for the other three parity bits might be as follows:

Second parity bit=0110
Third parity bit=0011
Fourth parity bit=1001

Based on these four parity bit equations an incoming message having the form 1001 would be encoded as 10011010 with the first four digits representing the information bits and the last four digits the parity bits.

It can be seen that if in the transmission process the third digit of the message is distorted so that it is received as a 1 instead of a 0, a recalculation of the second and third parity bit equations will reveal a discrepancy between the sums of those equations and the received parity check digit. Since only the third information bit occurs in both the second and third parity check equations, and no others, it may be assumed within a certain degree of probability that the third bit is the one which became distorted in transmission. Accordingly, the incoming message may be corrected by changing the state of the third information bit in the received message to develop a corrected outgoing message.

Similar techniques may be used with much more powerful codes to correct a number of errors in a message and a variety of classes of errors which occur, such as random errors or errors in sequence or "bursts." The present invention can operate with any of these codes and can decode extremely long messages, such as those containing about 1000 parity bits, at very low cost.

ENCODER

Figure 2:
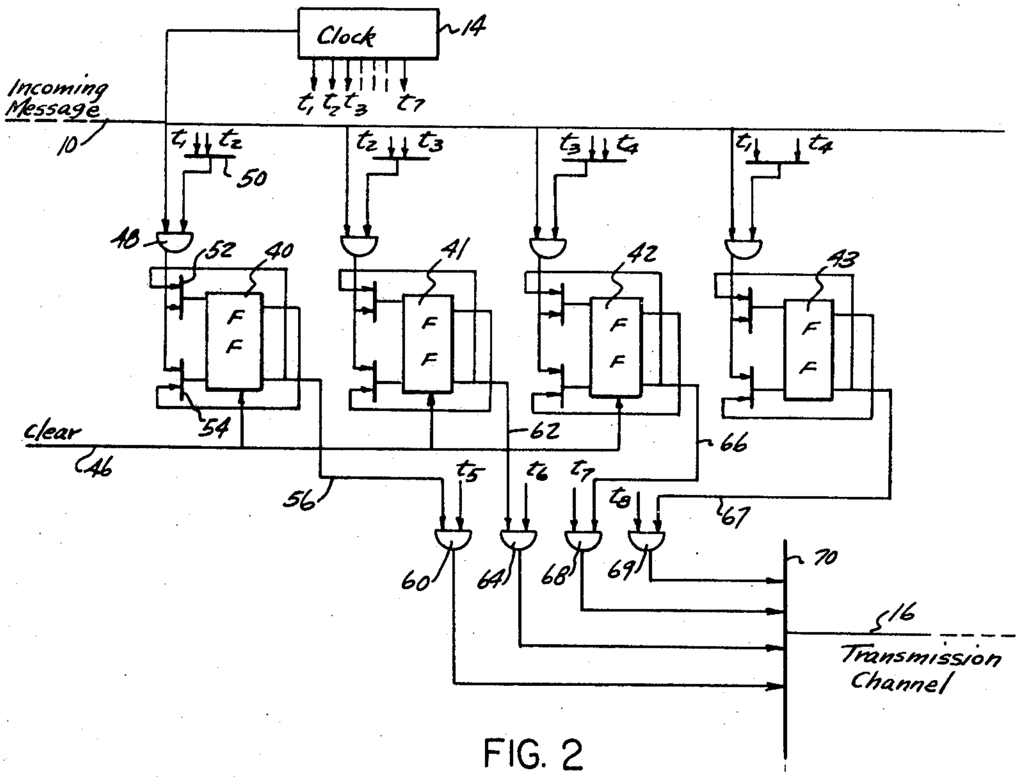
FIGURE 2 is a schematic view, partially in block form, of an encoder employed with a preferred embodiment of the invention, operative to receive a message to be transmitted in binary form, and to add a number of parity digits.
Figure 3:
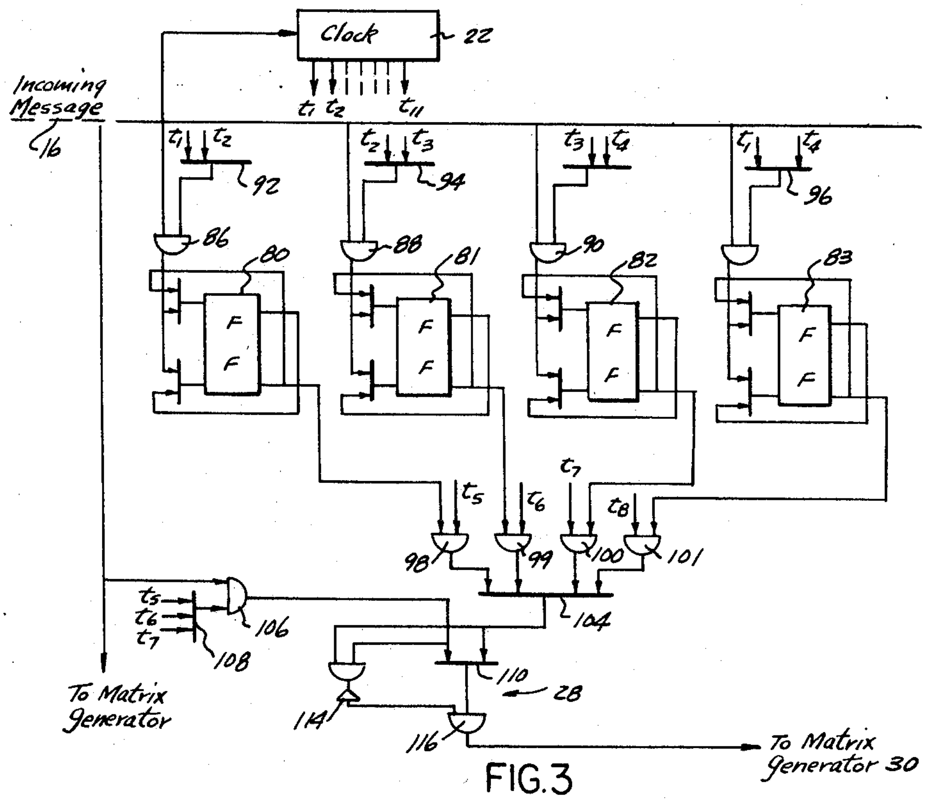
FIGURE 3 is a schematic view, partially in block form, of the message receiving section of a decoder used with the preferred embodiment of the invention.

The encoder disclosed in FIGURE 2 is adapted to encode a four information bit incoming message by adding four parity bits formed in accordance with the parity bit equations set forth above to provide an eight bit outgoing message to the transmission line 16. The incoming message is provided to the clock 14 which may constitute a ring counted with internal logic operative to provide a sequence of eight timing pulses following its energization by a suitable marker pulse preceding the incoming message on line 10. Alternatively, the clock 14 might be synchronized by other connections to the source of the incoming message 10. The four parity check bits which are to occupy the fifth, sixth, seventh and eighth bit positions of the message provided to transmission line 16 are calculated by flip-flops 40, 41, 42 and 43, respectively. At the beginning of reception of a message on line 10 the flip-flops are all in an initial low state resulting from a "clear" signal provided to each of them on line 46. The flip-flop 40 is controlled by an AND gate 48 which has the incoming message on line 10 as one of its inputs and the output of an OR gate 50 as its other input. OR gate 50 receives the timing pulses T1 and T2. Accordingly, if a 1 appears in the incoming message at bit positions one or two the flip-flop 40 is caused to change state, once for each such 1. This is done by providing the output of the AND gate 48 to a pair of OR gates 52 and 54 which feed the two inputs of the flip-flop 40 and have the unit's opposite outputs as their other inputs. Thus, after the four bits of the incoming message have been received the output side of flip-flop 40, connected to line 56, will be high if an odd number of 1's were present in the first two bit positions of the incoming message and will be low if an even number of bits occupy these positions. Thus, its state will represent the sum of the first parity bit equation. The control arrangement for flip-flops 41, 42 and 43 are identical except for the particular sequence of timing pulses which are applied to their input gating logic. Thus, at the beginning of the fifth timing pulse (T5) the states of the flip-flop 40, 41, 42 and 43 represent the sums of the first, second, third and fourth parity bit equation respectively. The high output of flip-flop 40 on line 56 is provided to an AND gate 60 which has the T5 timing pulse as its other input. Similarly the high output of flip-flop 41 on line 62 is provided to AND gate 64 which has the T6 timing pulse as its other conditioning input, the high output of the flip-flop 42 on line 66 is provided to an AND gate 68 which has the T7 timing pulse as its other conditioning input, and the high output of flip-flop 43 on line 67 has the 78 timing pulse as its other conditioning input. The outputs of the four AND gates 60, 64, 68 and 69 are summed with the incoming message through an OR gate 70 so as to add the four parity bits to the four information bits to construct the outgoing message in code on line 16.

Similar encoding arrangements can be provided for any systematic parity code and can be implemented with relatively simple encoding apparatus which is known to the art.

DECODER

Parity generator

The clock 22 used in the decoding section 20 is substantially similar to the clock 14 used in the encoder, but provides a larger number of timing pulses. It controls the operation of the decoder 20 in synchronism with the incoming pulses from the transmission line.

The parity generator 24 accepts the message from the transmission line 16 and uses the information bits therein to recalculate the parity digits so that they may be compared with the received parity check digits to determine any errors introduced in transmission. The parity generator 24 is substantially identical to the encoder. Four flip-flops 80, 81, 82 and 83 compute parity check digits by appropriate gating of the bits of the incoming message through AND gates 86, 87, 88 and 89, respectively. The AND gates are conditioned by OR gates 92, 93, 94 and 95 which resolve the particular parity check equations being calculated by their respective flip-flops. The high output of flip-flop 80 is provided to an AND gate 98 which is also conditioned by timing signal T5; the high output of flip-flop 81 is provided through an AND gate 99 that is conditioned by timing output T6; the high output of a flip-flop 82 is provided to an AND gate 100 which is conditioned by timing pulse T7; and the high output of flip-flop 83 is provided to an AND gate 101 which is conditioned by timing pulse T8. The outputs of the four AND gates are provided through an OR gate 104 to the comparator 28 which simply takes the form of a half adder. If the parity check digits received from the incoming message during time T5, T6, T7 or T8 are in agreement with the output of the OR gate 104 at that time the output of the half adder 28 is 0. The parity check bits in the incoming message are provided to the half adder 28 by an AND gate 106 which is conditioned by timing pulses T5, T6, T7 and T8. The comparator 28 consists of a half adder which receives the output of the AND gate 106 and the OR gate 104 at both an OR gate 110 and an AND gate 112. The output of the AND gate 112 is inverted by unit 114 and provided to an AND gate 116 along with the output of the OR gate 110. The output of the AND gate 116 is fed to the matrix generator 30 and consists of a 0 if the received parity digit as provided by the AND gate 106 is in accord with the calculated parity digit provided by the OR gate 104, and a 1 if the two are not in agreement.

Matrix generator

Figure 4:
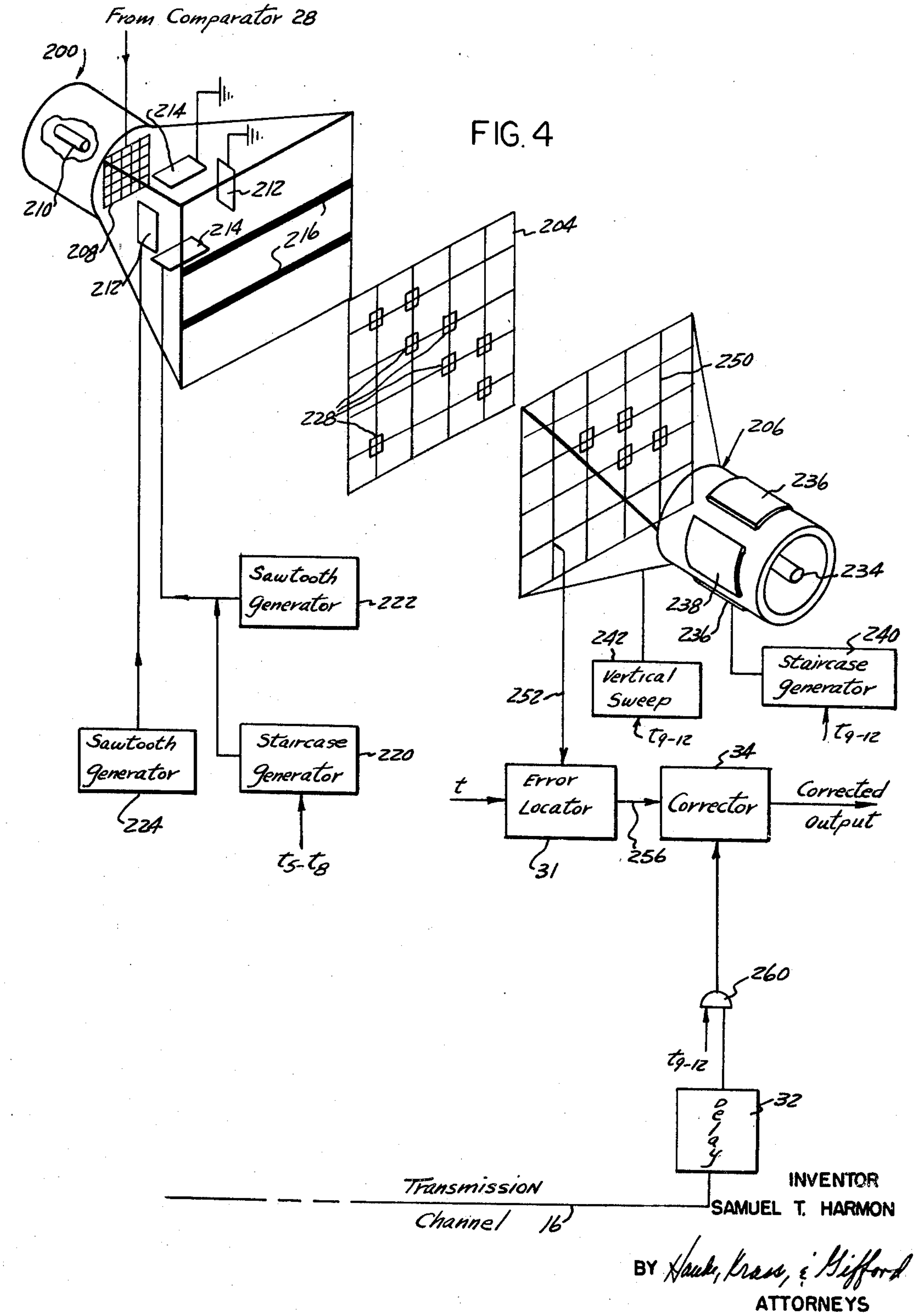
FIGURE 4 is a block diagram, partially in perspective form of a first embodiment of a matrix generator and message corrector which may be used with the preferred embodiment of the invention.

The matrix generator 30 broadly consists of a cathode ray tube 200, a mask 204 which fits over the face of the cathode ray tube, and a vidicon tube 206 which has its photosensitive surface disposed adjacent the mask 204 so as to be exposed to the face of the cathode ray tube 200 through the mask. As shown in FIGURE 4, the cathode ray tube, mask and vidicon are separated from one another for purposes of illustration. In use the faces of the two tubes would closely sandwich the mask.

The cathode ray tube 200 is of a normal variety providing some means of Z axis modulation, such as a screen grid 208 which is placed between an electron gun 210 and sets of horizontal deflection plates 212 and vertical deflection plates 214. The Z axis grid 208 is connected to the output of the comparator 28 so as to receive pulses indicative of a disparity between the calculated and received parity digits.

Upon reception of a pulse from the comparator the potential on the grid 208 is such as to accelerate electrons from the gun 210 through the deflecting electrodes to the screen 216 to illuminate the portion thereof intersected by the electron beam. When no pulse is received from the comparator 28 the grid blocks the flow of electrons from the gun and no beam reaches the screen 216.

The vertical deflection of the electron beam is determined by the potential across the plates 214 produced by a digital staircase generator 220. The generator may be of the type described in the book "Pulse and Digital Circuits," by Millman and Taub, McGraw-Hill Book Company, 1956, at page 348. The input to the staircase generator represents the timing pulses T5–T8. During the T5 pulse the electron beam is vertically aligned so as to intersect the screen below its top edge. With each succeeding pulse the beam moves downwardly so that it reaches four successive lines on the cathode ray tube face. During each of the four time periods of T5–T8 any electron beam generated as the result of a pulse from the comparator 28 occupies a successively lower level on the face of the cathode ray screen 216. The voltage from a saw-tooth generator 222 is superimposed on the output of the digital staircase generator 220. The saw-tooth generator has an output voltage substantially smaller than the maximum voltage developed by the staircase generator 220. Its maximum may be about 5% of the maximum of the staircase generator. The frequency of the saw-tooth generator is not synchronized with the staircase generator but is preferably several hundred times the frequency of the timing pulses. Accordingly, the saw-tooth tends to cause the electron beam to occupy successive vertical bands of appreciable but not overlapping width, rather than narrow vertical lines.

Another saw-tooth generator 224 provides voltage to the horizontal deflection plates 212. The frequency of saw-tooth 224 is preferably several times that of the timing pulses. As the result of these deflection voltages, if a pulse is emitted from the comparator 28 a horizontal band appears across the face of the cathode ray tube. This band will occupy one of four vertical positions depending upon the timing period in which the comparator pulse is received. The presence of any one of the bands represents an inconsistency between one of the received parity check digits and the equivalent calculated parity check digit. For example, if the parity check equation calculated by the flip-flop 81 in the parity generator produced a result which is inconsistent with the parity bit received at T6 an output pulse would be generated by the comparator 28 and a horizontal band would appear on the face of the cathode ray tube, during T6, at a vertical elevation slightly above the center of the cathode ray tube. If the other three received parity check digits agree with the sums of their respective parity check equations this would be the only vertical line generated on the cathode ray tube face.

Alternatively, the selected horizontal bands might be produced by apparatus other than the cathode ray tube. For example, a vertical column of lamps coincident with the bands might be disposed behind a cylindrical lens which would spread the light into a horizontal strip. The lamps could be energized the same way as the Z axis of the scope is modulated.

The mask 204 which is disposed in abutment to the cathode ray tube face 216 is formed with a plurality of holes 228 which are disposed at one of four vertical elevations which align with the four vertical spacings of the illuminated bands which may appear on the cathode ray tube face. The holes 228 are constructed in accordance with the matrix formed by arranging the four parity check equations in a vertical row, with a hole being formed for each 1 in the parity check equation. Thus, the holes 228 formed in the mask 224 are arranged in the following array:

1100
0110
0011
1001

The opaque portions of the mask block out the adjacent illuminated portions of the cathode ray tube face. Thus, the face 230 of the vidicon is only exposed to the cathode ray surface through the apertures 228. Since the holes in one vertical line of the cathode ray tube of the mask 204 represent the 1's in a particular parity check equation and the face of the cathode ray tube 216 is only illuminated in a particular vertical line when the parity check equation fails, the face of the vidicon 206 is exposed to a light matrix consisting of only the parity check equations which have failed with an illuminated spot representing a 1 and a non-illuminated spot representing a 0.

The matrix of the light falling on the photosensitive face of the vidicon produces a corresponding positive potential portion on the gun side. The gun side of the photosensitive surface is scanned by an electron beam produced by the cathode 234. The deflection of the beam produced by the cathode 234 and the point at which the beam intersects the face is determined by the potential applied to sets of vertical deflecting coils 236 and horizontal deflecting coils 238. The horizontal plates 238 are powered by a digital staircase generator 240 which is of the same nature as the generator 220. Its input represents the four timing pulses T9–T12. During the T9 pulse the horizontal deflection plates maintain the beam from the cathode 234 at the left end of the face of the vidicon and during the next three successive timing pulses the beam is moved to successive positions toward the right side.

The vertical deflection coils 236 are powered by a vertical sweep circuit generator 242 which may be of the type described in the Millman and Taub reference at page 247. The vertical sweep circuit has timing pulses T9–T12 as its input and upon the concurrence of each pulse it moves the cathode beam downwardly from the top to the bottom of the screen. By the combined action of the vertical deflection coils 236 and horizontal deflection coils 238 the cathode beam of the vidicon tube is moved successively through four vertical columns during timing pulses T9–T12, the columns coinciding with the columns of the matrix appearing on the face of the beam.

As the beam intersects an area on the vidicon face which has been illuminated, the positive charge on this face area provides a pulse to the signal grid 250. This pulse is carried on line 252 to the error locator 31, which simply constitutes a counter. The counter should have a counting rate of approximately ten times the pulse rate of the timing pulses. It is initially reset to 0 by the timing pulses at the beginning of each timing pulse. It then counts the number of pulses provided on the line 252 as the vidicon beam sweeps a vertical count. If a count of two or more pulses is achieved the counter 31 provides an output on line 256 to the corrector 34. The corrector 34 constitutes a half adder substantially identical to the comparator 28. It is fed the four received information bits from an AND gate 260 which is conditioned by timing pulses T9 through T12 and the output of the unit 32 which delays the incoming message for eight timing pulse periods. The corrector also receives the output of the error locator 31 and adds the two. If no output is received from the locator 31 during a particular time period the output of the corrector 34 during that time period is simply the same as the information bit in the received message. However, if a pulse is received from the lacotor 31 during a given time period the output of the corrector constitutes the opposite of the received information pulse; that is, a 1 information pulse is changed to a 0 and vice versa.

Operation

The system thus described, and the code employed, is capable of detecting and correcting a received error in any single digit of the received message. Using the previous example to illustrate the operation of the device, assume that the incoming message on line 10 constitutes 1001. The encoder then generates the four parity check bits 1010 to provide an encoded message on transmission channel 16 of 10011010.

If the third information digit of the message is distorted in transmission so that it is received as a 1 instead of a 0, the four flip-flops 80, 81, 82 and 83 in the parity generator would produce outputs of 1, 1, 0 and 0, respectively. When these are compared to the received parity bits of 1, 0, 1, 0, respectively, by the comparator 28, pulse outputs will be provided by the comparator during T6 and T7, the time periods in which the second and third parity equations are checked.

Accordingly, horizontal bands will be illuminated across the width of the cathode ray tube face 216 in coincidence with the second and third lines of holes 228 and mask 204 as shown by phantom lines 260 in FIGURE 4. The matrix thus created on the face of the vidicon 206 will be as follows:

0000
0110
0011
0000

As the vidicon beam scans the four vertical columns of this matrix during time periods T9 through T12, beginning with the left-most column, the respective count of pulse outputs on line 252 will be 0, 1, 2, 1. Since the counter 254 is preset to provide an output pulse only when a count of 2 or more is achieved during any timing period, a pulse output will appear on line 256 only during time period T11. As the third information bit is passed through the corrector 34 during T11, its received (but incorrect) state 1 will be changed to a 0 by summing with the simultaneous pulse occurring on line 256. Thus, the corrected output of the unit will be the four digits, 1001, which represents the incoming message on line 10. The unit has thus detected and corrected the error in the third information digit place.

The code described is capable of detecting and correcting all errors of a single bit in an incoming message and certain two and three bit errors. The code employed is so simple that it would probably not be used in practice, but is useful for illustration purposes.

In practice, much longer code words would be employed in order to achieve the higher transmission efficiencies which accrue to this class. The primary limitation on the length of a code which could be used with the preferred embodiment of the invention, as disclosed, would be the size and resolution of the vidicon tube face. Using commercially available vidicon tubes a safe resolution of one thousand elements across each of the vertical and horizontal dimensions of the tube may easily be achieved. Thus, the system described could be used with a code having as many as one thousand information bits (which determine the width of the vidicon face matrix) and one thousand parity bits (which determine the height of the parity check matrix). When message words of larger length are used a high probability of freedom from error may be achieved with far fewer parity bits than information bits. For example, a word having one thousand information bits and two hundred parity bits might produce an extremely low probability of error when transmitted at a rate very close to the theoretical maximum channel capacity as calculated by Shockley's theory, supra.

A system for handling such a large code word built in accordance with the preferred embodiment of the invention would simply require the addition of one flip-flop and an associated logic circuit for each parity check digit. The matrix generating apparatus would remain substantially the same, except that the staircase generators would be required to provide a larger number of steps.

Figure 5:
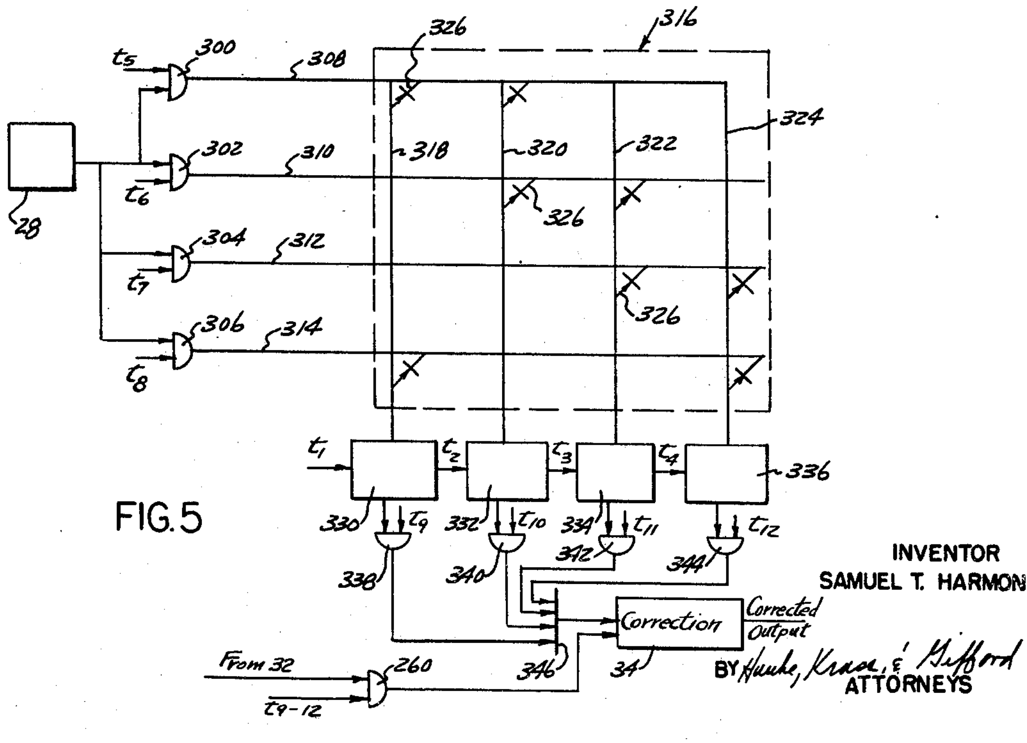
FIGURE 5 is a second embodiment of a matrix generator and message correcting apparatus employing a diode matrix which may be used in connection with the preferred embodiment of the invention as a substitute for the apparatus of FIGURE 4.

In the alternative embodiment of the matrix generator disclosed in FIGURE 5 the outputs of the comparator 28 are provided to four AND gates 300, 302 ,304 and 306. These AND gates are respectively conditioned by timing pulses T5 through T9, so that their outputs sequentially appear on four lines 308, 310, 312 and 314. These lines represent the row connections in a diode matrix generally indicated at 316. The matrix consists of the four horizontal lines 308, 310, 312 and 314 and four vertical lines 318, 320, 322 and 324. Interconnections are made between the vertical lines and the horizontal lines at points in the matrix representative of 1's in the respective parity bit equations by diodes 36.

The four horizontal lines 318, 320, 322 and 324 are connected to counters 330, 332, 334 and 336 respectively. These counters are identical to the counter 31 employed in the embodiment of FIGURE 4 and provide output signals when their count exceeds two. Each of the counters is reset by the timing pulse T1.

The outputs of the counters 330, 332, 334 and 336 are commutated by AND gates 338, 340, 342 and 344 and summed band OR gate 346 for provision to the corrector 34. The corrector also receives the delay information pulses from the AND gate 260.

The AND gates 300, 302, and 304 and 306 are enabled when a disparity is detected between the parity check bit received during this respective commutation period and the calculated parity check bit as generated by the flip-flops 80–83. Each such disparity provides a pulse on one of the lines 308, 310, 312 or 314. These pulses are provided through all the diodes which connect to such line to respective counters 330, 332, 334 and 336. By way of example, if the second and third parity check equations fail outputs are provided on line 310 during T6 and on line 312 during T7. The pulse on line 310 passes through the interconnecting diodes to the vertical lines 320 and 322, and, thus, to the counters 332 and 334. The pulse on line 312 similarly passes to vertical lines 322 and 324 and counters 334 and 336. At the end of timing pulse T8 the counter 330 will have a 0 count, the counter 332 will have a single count, the counter 334 will have a double count, and the counter 336 will have a single count. Therefore, a pulse will appear on the output of the counter 334 only and will remain there until the counter is reset by the timing pulse T1.

The AND gates 338, 340, 342 and 344 commutate the outputs of the counters during timing pulses T9 through T12 and provide them through an OR gate to the corrector 34. The corrector acts as previously described to modify the received information pulses and provide a corrected output.

Figure 6:
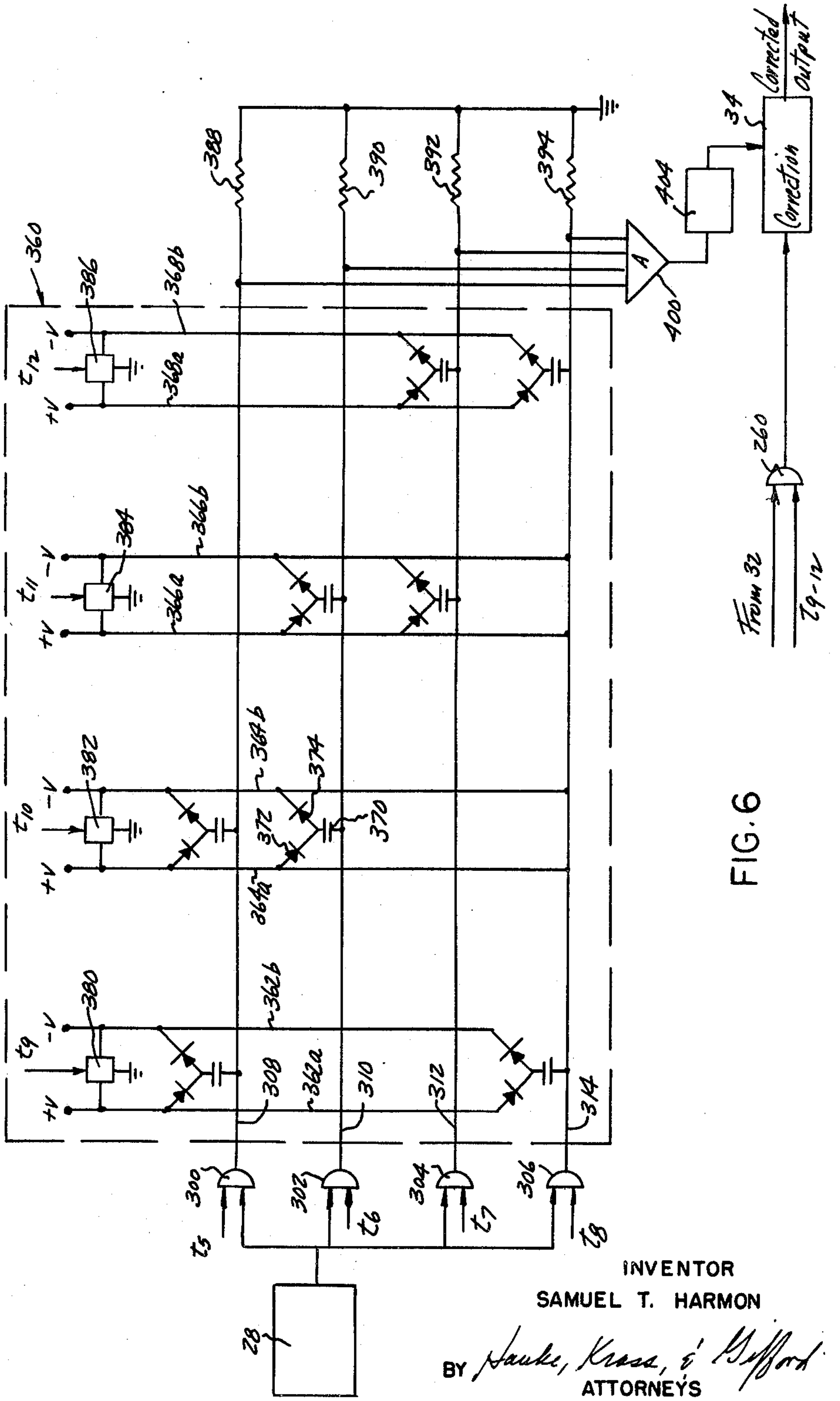
FIGURE 6 is a third embodiment of the invention employing a capacitive storage array that may be substituted for the matrix generator of FIGURE 4.

A third embodiment of the invention, illustrated in FIGURE 6, replaces the diode matrix 316 with a capacitive storage matrix, generally indicated at 360. The matrix is constructed with four sets of vertical lines 362*a* and *b*, 364*a* and *b*, 366*a* and *b*, and 368*a* and *b*. The horizontal lines of the matrix consist of the output lines 308, 310, 312 and 314 of the AND gates 300, 302, 304 and 306 respectively. A vertical line set is connected to a horizontal line at the points in the matrix represented by 1's in the parity check equations. The connections are made by diode capacitor sets which consists of capacitors 370 having one terminal connected to the horizontal line and the other terminal connected to the common points between two diodes 372 and 374 which are both arranged to conduct in the same direction and are connected between one of the sets of vertical lines.

The "*a*" member of each pair of vertical lines is connected to a potential +V and the "*b*" member of each pair is connected to a potential —V. Thus, when an output pulse is provided on one of the lines 308–314 the capacitors connected to that line are charged to a positive voltage (assuming a negative pulse). At the end of T8, when the matrix is fully charged, the vertical line pairs are successively brought to ground potential by means of switches 380, 382, 384 and 386 which are conditioned by the timing pulses T9–T12 respectively. As one of the vertical line pairs is grounded an output pulse is provided on its respective horizontal line. These pulses are provided to resistors 388, 390, 392 and 394 which have their other ends grounded. The voltages across these resistors at any particular time are summed by an operational amplifier 400 and fed to a threshold detector 404, which provides an output pulse when its input voltage exceeds a predetermined vaue. In the present case the value is equal to that of the voltage produced when any two of the resistors 388–394 receive simultaneous pulses. The pulse output from the threshold detector 404 is fed to the corrector 34 as in the previous embodiment.
T9–T12, correcting signals are provided to modify the generating section 24 is only operative during timing corrector 34 as in the previous embodiment.

As the matrix is thus scanned during time periods T9–A12, correcting signals are provided to modify the received message digits in providing corrected output.

In all three embodiments of the invention the parity generating section 34 is only operative during timing pulses T1–T8 and the matrix generating section is operative during timing pulses T5–T12. Accordingly, the parity generator can accept a new input message beginning at T9 although the clock will have to be modified if this close sequence is followed.

While the error detecting and correcting technique of the preferred embodiment simply consists of modifying a received information digit when the sum of any column in the matrix exceeds a predetermined value, other conditions based upon various manipulations of the matrix could be used to correct numbers. Such manipulations would be dependent upon the nature of the code employed. The technique employed in the preferred embodiment wherein an error is detected and corrected when the sum of a column reaches a certain value, may be termed "majority logic" and the number employed would vary with each code. With other codes errors might be detected based on sums of certain elements of the matrix and corrected based on sums of other elements. Alternatively, the ratios between various sums might be employed.

Having thus described my invention, I claim:

1. In an information transmission system for a digital message having a first plurality of information digits which includes:

- an encoder operative to receive said information digits and to generate a second plurality of parity digits which represent the sum of a second plurality of parity check equations each involving only certain of the information digits;
- an information transmission channel connected to receive from the encoder an encoded message consisting of the information digits plus the parity digits;
- a decoder operative to receive the encoded message from the transmission channel and to detect and correct errors, said decoder including:
  - comparator means for receiving the encoded message from the transmission channel and for determining the identity of those parity check equations for which the received information digits and received parity digits are inconsistent;
  - a matrix generator operative to receive signals from said comparator means representative of the inconsistent parity check equations and to construct a two-dimensional matrix on a radiation sensitive surface from the set of inconsistent parity equations; and
  - means under control of the matrix generator for correcting the received encoded message by modifying the condition of certain information digits.

2. The information transmission system of claim 1 wherein the two dimensional matrix is constructed with digits of parity check equations representing the same information digit arranged in rows and means is provided for adding the elements in each row to determine the number of inconsistent parity check equations in which each information digit occurs.

3. The information transmission system of claim 1 wherein the information is in binary form and each parity check equation represents the modulo 2 sum of various information digits and the two dimensional matrix contains elements in positions along one co-ordinate which are associated with inconsistent party check equations and which coincide with positions along the other co-ordinate which represent the presence of 1's in the parity check equations.

4. The information transmission system of claim 1 wherein the two dimensional matrix is constructed on an emission sensitive surface by projecting a plurality of emission bands in the direction of the surface at positions related to inconsistent parity check equations, and passing said emission bands through a mask constructed on the basis of the parity check equations.

5. The information transmission system of claim 4 wherein the emission sensitive surface constitutes a television pick-up tube and the number of inconsistent parity check equations in which each information digit occurs is determined by scanning rows of the two dimensional matrix and counting the number of energized elements associated with each row.

6. The information transmission system of claim 1 wherein the information digits are stored while the means for determining the number of inconsistent parity check equations in which each information digit occurs is operative.

7. The information transmission system of claim 2 wherein the means for adding the rows to determine the number of inconsistent parity check equations in which each information digit occurs consists of a separate counter associated with each row, and means for providing a number of pulses to each counter equal to the number of elements energized in its associated row.

8. The information transmission system of claim 2 wherein the means for adding the rows to determine the number of inconsistent parity check equations in which each information digit occurs consists of a single counter and means for sequentially determining the number of elements which are energized in each row and providing such information to the counter.

9. The information transmission system of claim 2 wherein the means for adding elements in each row to determine the number of inconsistent parity check equations in which each information digit occurs consists of means for simultaneously generating pulses for each element in a row which is energized, and means for summing the pulse amplitudes at the time the pulses are generated to develop a voltage proportional to the number of energized elements in a row.

10. The information transmission system of claim 4 wherein the emission sensitive surface consists of the face of a vidicon tube and the number of inconsistent parity check equations in which each information digit occurs is determined by sequentially scanning rows of the tube with the electron beam and counting the number of energized elements associated with each row.

11. Apparatus for correcting a transmission error in an incoming sequency of N binary pulses of which M are information pulses while the remainder K are parity pulses, each of said parity pulses being the sum of a single preassigned parity check equations, therebeing K of such parity check equations, which comprises means for receiving said incoming pulses consecutively, means for developing from said incoming pulse sequence all the pulses of each parity check equation, means for determining the sum of the pulses of each said parity check equation, means for comparing each of said sums with its respective parity pulse to determine inconsistent parity check equations, means for generating a two dimensional matrix on a radiation sensitive surface of the set of inconsistent parity check equations with elements representing the same information pulse arranged in rows and means for adding the number of elements in each of the rows.

12. The apparatus of claim 11 which includes means for delaying the original pulse sequence for a time equal to the time required for said determination and identification.

13. The apparatus of claim 11 wherein said means for generating said two dimensional matrix consists of a radiation sensitive surface, a mask for said surface having apertures therein based upon the arrangement of the parity check equations, and emission means for projecting emission through various positions on the mask which represent the inconsistent parity check equations.

14. The apparatus of claim 13 wherein the radiation sensitive surface consists of a face of a television pick-up tube having an electron beam adapted to scan the surface and provide an output indication upon contacting an area of the surface which has received emission, and the means for adding a number of elements in each of the rows consists of electronic circuitry for causing the electron beam to sequentially scan each of the rows, and counter means operative to determine the number of output indications provided by the electron beam during a scan of each row.

15. The apparatus of claim 14 wherein the emission means for projecting emission through various positions on the mask which represent the inconsistent parity check equations consists of a cathode ray tube, electronic circuitry for causing the electron beam of the cathode ray tube to scan successive normally spaced parallel lines on the face of said tube in timed relation to the comparison of the sums of the pulses of each said parity check equation with its respective parity pulse, and means for modulating the electron beam of the cathode ray tube so as to illuminate the face of the cathode ray tube during the scan of a line which occurs following the determination of an inconsistent parity check equation.

(References on following page)

References Cited

UNITED STATES PATENTS

| | | | |
|---|---|---|---|
| 2,596,199 | 5/1952 | Bennett | 340—146.1 X |
| 2,728,906 | 12/1955 | Rea | 340—165 X |
| 3,098,219 | 7/1963 | Voigt et al. | 340—165 X |
| 3,130,397 | 4/1964 | Simmons | 340—165 X |
| 3,152,320 | 10/1964 | Donenico et al. | 235—153 X |
| 3,355,723 | 11/1967 | Clark | 340—166 X |

MALCOLM A. MORRISON, Primary Examiner
C. E. ATKINSON, Assistant Examiner

U.S. Cl. X.R.

235—153; 340—165